(12) United States Patent
Saraswat et al.

(10) Patent No.: US 12,105,815 B2
(45) Date of Patent: Oct. 1, 2024

(54) SYSTEM AND METHOD FOR MANAGING EXTERNAL PROCESSING IN A WEB-BASED COMPUTING SYSTEM

(71) Applicant: Schlumberger Technology Corporation, Sugar Land, TX (US)

(72) Inventors: Puneet Saraswat, Houston, TX (US); Vincent Bergbauer, Houston, TX (US); Cyril Simon Ferdinand Lagrange, Abingdon (GB); Arnaud Houegbelo, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 262 days.

(21) Appl. No.: 17/753,338

(22) PCT Filed: Aug. 24, 2020

(86) PCT No.: PCT/US2020/070447
§ 371 (c)(1),
(2) Date: Feb. 28, 2022

(87) PCT Pub. No.: WO2021/042121
PCT Pub. Date: Mar. 4, 2021

(65) Prior Publication Data
US 2022/0300628 A1  Sep. 22, 2022

Related U.S. Application Data

(60) Provisional application No. 62/893,223, filed on Aug. 29, 2019.

(51) Int. Cl.
*G06F 21/60* (2013.01)
*G06F 9/54* (2006.01)
*G06F 21/62* (2013.01)

(52) U.S. Cl.
CPC .......... *G06F 21/604* (2013.01); *G06F 9/546* (2013.01); *G06F 21/6281* (2013.01); *G06F 2209/548* (2013.01)

(58) Field of Classification Search
CPC .... G06F 21/604; G06F 9/546; G06F 21/6281; G06F 2209/548; G06F 9/545;
(Continued)

(56) References Cited

U.S. PATENT DOCUMENTS

2011/0004622 A1\* 1/2011 Marson ................. G06Q 10/06
                                                        707/812
2012/0180039 A1    7/2012 Bravery et al.
(Continued)

OTHER PUBLICATIONS

Strauch S. et al., "ESBMT: A multi-tenant aware enterprise service bus," International Journal of Next-Generation Computing. Nov. 2013. 1: 4(3): 230-49.
(Continued)

*Primary Examiner* — Jacob Lipman
(74) *Attorney, Agent, or Firm* — Jeffrey D. Frantz

(57) ABSTRACT

A computing system includes one or more processors and a memory. The memory stores instructions that cause the processors to generate a multi-tenant processing environment, and provide, for each of a plurality of tenants, a secure partition to store and isolate data and computational resources of a tenant. The instructions cause the processors to receive, from the tenant, a request to register, with the multi-tenant processing environment, a tenant application to be executed by the secure partition of the tenant. Responsive to the request, the instructions cause the processors to create a partition request message queue, a partition response message queue, and to create, within the secure partition, an application manager. The application manager receives computation parameters from the partition request message queue, passes the computation parameters to the tenant
(Continued)

application, receives a computation result from the tenant application, and stores the computation result in the partition response message queue.

24 Claims, 5 Drawing Sheets

(58) Field of Classification Search
CPC ....... H04L 47/78; H04L 47/803; H04L 47/76; H04L 47/828; H04L 67/00; G06Q 10/06
USPC .......................................................... 726/26
See application file for complete search history.

(56) References Cited

U.S. PATENT DOCUMENTS

| | | | | |
|---|---|---|---|---|
| 2012/0304307 A1* | 11/2012 | Ramesh | ................ | G06Q 10/06 |
| | | | | 726/28 |
| 2013/0013920 A1 | 1/2013 | Dixon | | |
| 2013/0297685 A1 | 11/2013 | McGrath et al. | | |
| 2014/0032228 A1* | 1/2014 | Johri | ................... | G06F 21/6227 |
| | | | | 705/1.1 |
| 2016/0094510 A1* | 3/2016 | Xiao | .................... | G06Q 10/107 |
| | | | | 709/206 |
| 2016/0127254 A1 | 5/2016 | Kumar et al. | | |
| 2017/0006135 A1* | 1/2017 | Siebel | .................... | G06Q 10/06 |
| 2017/0359410 A1 | 12/2017 | Thakkar et al. | | |
| 2018/0191855 A1* | 7/2018 | Almond | .............. | H04L 67/1001 |
| 2022/0014421 A1* | 1/2022 | Medam | ................... | H04L 63/08 |

OTHER PUBLICATIONS

Search Report and Written Opinion of International Patent Application No. PCT/US2020/070447 dated Nov. 9, 2020, 18 pages.
Binildas C.A., "Service Oriented Java Business Integration," 2008 Pakt Publishing ISBN 978-1-847194-40-4; 436 pages (title page and table of contents provided).
International Search Report and Written Opinion issued in International Patent Application No. PCT/US2020/070447 on Nov. 9, 2020; 18 pages.
International Preliminary Report on Patentability of International Patent Application No. PCT/US2020/070447 dated Mar. 10, 2022, 9 pages.

* cited by examiner

SYSTEM AND METHOD FOR MANAGING EXTERNAL PROCESSING IN A WEB-BASED COMPUTING SYSTEM

CROSS-REFERENCE TO RELATED APPLICATIONS

This application is a National Stage Entry of International Patent Application No. PCT/US2020/070447, filed on Aug. 24, 2020, which claims priority to U.S. Provisional Patent Application No. 62/893,223, which was filed on Aug. 29, 2019, and is incorporated herein by reference in its entirety.

BACKGROUND

In network-based computing environments (e.g., "cloud" computing environments), multitenancy is often employed to reduce system operational and maintenance costs. In a multi-tenant computing system, a single instance of a software application serves multiple tenants. A multi-tenant computing system may be implemented as one or more servers implemented using the computing resources of a cloud computing environment. A tenant may be an entity (or a system associated with the entity) that accesses the software application.

SUMMARY

A multi-tenant processing environment that supports execution of tenant proprietary applications in a secure partition is disclosed herein. In one example, a computing system includes one or more processors and a memory. The memory is coupled to the one or more processors and is encoded with instructions that when executed cause the one or more processors to generate a multi-tenant processing environment, and provide, for each of a plurality of tenants of the multi-tenant processing environment, a secure partition configured to store and isolate data and computational resources of a tenant. The instructions also cause the one or more processors to receive, from the tenant, a request to register, with the multi-tenant processing environment, a tenant application to be executed by the secure partition of the tenant. Responsive to the request, the instructions cause the one or more processors to create a partition request message queue, a partition response message queue, and to create, within the secure partition, an application manager. The partition request message queue is configured to pass computation parameters from a multi-tenant application to the secure partition of the tenant. The partition response message queue is configured to pass a computation result from the secure partition of the tenant to the multi-tenant application. The application manager is configured to receive the computation parameters from the partition request message queue, to pass one or more of the computation parameters to the tenant application, to receive the computation result from the tenant application, and to store the computation result in the partition response message queue.

In another example, a non-transitory computer-readable medium is encoded with instructions that when executed by a processor cause the processor to generate a multi-tenant processing environment, and provide, for each of a plurality of tenants of the multi-tenant processing environment, a secure partition configured to store and isolate data and computational resources of a tenant. The instructions also cause the processor to receive, from the tenant, a request to register, with the multi-tenant processing environment, a tenant application to be executed by the secure partition of the tenant. The instructions further cause the processor to, responsive to the request: create a partition request message queue, create a partition response message queue, and create, within the secure partition, an application manager. The partition request message queue is configured to pass computation parameters from a multi-tenant application to the secure partition of the tenant. The partition response message queue is configured to pass a computation result from the secure partition of the tenant to the multi-tenant application. The application manager is configured to: receive the computation parameters from the partition request message queue, to pass one or more of the computation parameters to the tenant application, to receive the computation result from the tenant application, and to store the computation result in the partition response message queue.

In a further example, a method includes generating, by a computer system, a multi-tenant processing environment, and providing, by the computer system, for each of a plurality of tenants of the multi-tenant processing environment, a secure partition configured to store and isolate data and computational resources of a tenant. A request, from the tenant, to register, with the multi-tenant processing environment, a tenant application to be executed by the secure partition of the tenant is received by the computer system. Responsive to the request the computer system creates a partition request message queue, creates a partition response message queue, and creates, within the secure partition, an application manager. The partition request message queue is configured to pass computation parameters from a multi-tenant application to the secure partition of the tenant. The partition response message queue is configured to pass a computation result from the secure partition of the tenant to the multi-tenant application. The application manager is configured to: receive the computation parameters from the partition request message queue, to pass one or more of the computation parameters to the tenant application, to receive the computation result from the tenant application, and to store the computation result in the partition response message queue.

BRIEF DESCRIPTION OF THE DRAWINGS

For a detailed description of various examples, reference will now be made to the accompanying drawings in which.

DETAILED DESCRIPTION

Figure 1:
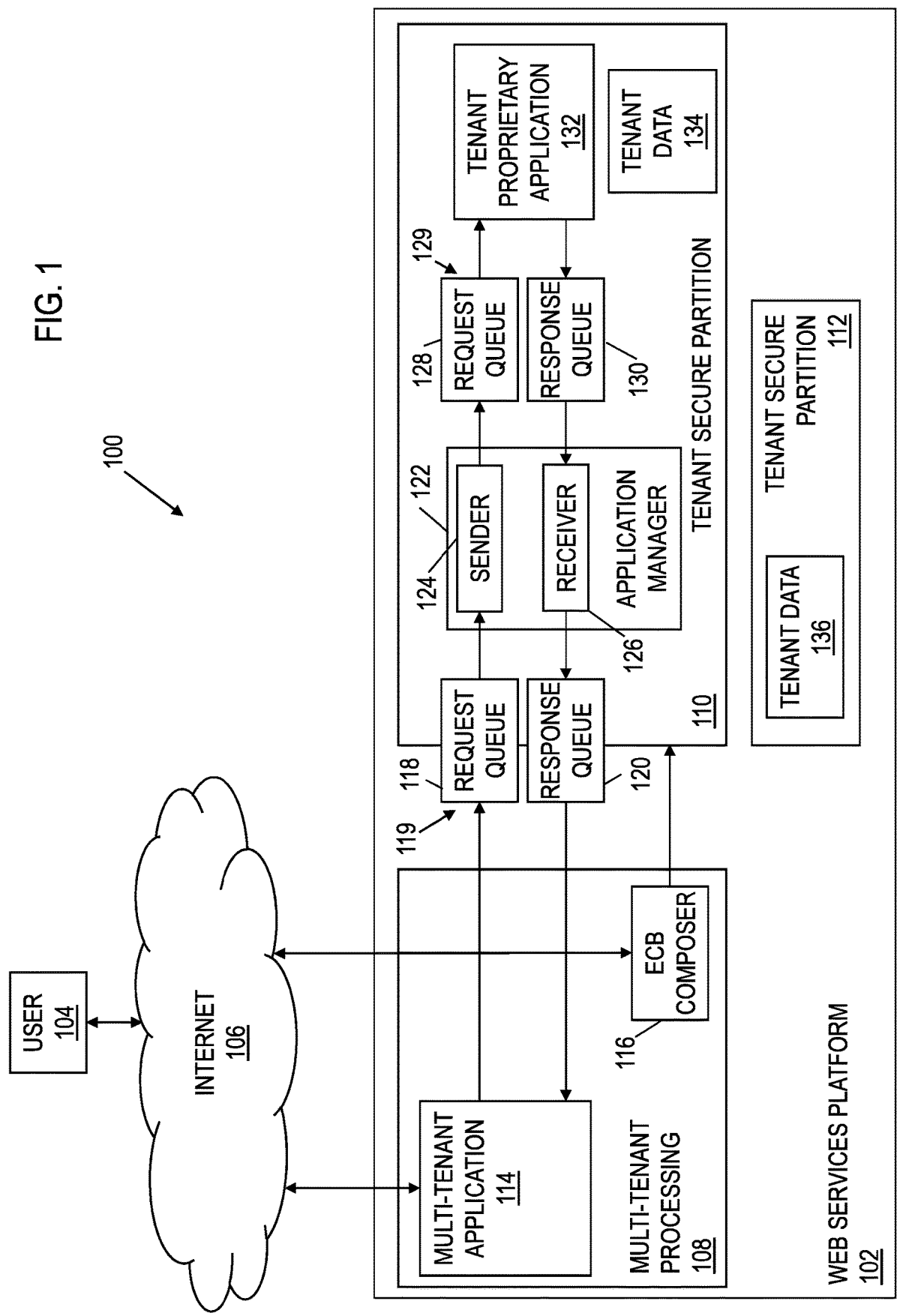
FIG. 1 shows a block diagram for an example computer system that provides multi-tenant processing with execution of a tenant proprietary application in a secure partition in accordance with the present disclosure.

The present disclosure is directed to managing tenant defined processing in a network-based computing system (e.g., a cloud-based computing system). More specifically, the systems and methods disclosed herein are directed to providing resources for and executing a tenant defined application in a secure partition of a multi-tenant processing environment. A multi-tenant processing environment reduces the computational resources required to provide a given set of computational functionalities to multiple entities by allowing a single instance of software to be shared by the multiple entities. Reducing the computational resources required to operate the processing environment reduces the overall cost of system operation and maintenance. However, sharing of software across multiple entities raises a security concern when the entities desire to maintain the privacy of data processed by the shared software and/or the results of such processing. In the systems and methods disclosed herein, data and application software privacy are maintained by assigning, to each entity using the multi-tenant processing environment, a secure partition for storage of private data and proprietary application software, where the secure partition is accessible only by or under the control of the entity.

Entities operating in a multi-tenant processing environment may also desire to extend the function of the environment in a proprietary manner. That is, an entity may desire to add computational functionality to the environment that is private to the entity. For example, an entity (a tenant) desires to add execution of an application to a processing flow provided by the multi-tenant processing environment, where the functionality of the application is isolated from the shared software executed by all tenants. Embodiments of the computing system disclosed herein allow an entity to execute a proprietary application in the secure partition assigned to the entity, thereby isolating the application from the shared software and from other tenants.

To provide for execution of a tenant proprietary application, a computing system of the present disclosure verifies the authority of a user requesting the addition of a tenant proprietary application to a multi-tenant processing flow to access and/or modify the tenant's secure partition. After such authority has been verified, an external computation broker (ECB) composer executing in the multi-tenant processing environment instantiates the constructs needed to execute the tenant application in the entity's secure partition. The various constructs instantiated by the ECB composer include extra-partition message queues for two-way communication between a multi-tenant application and the entity's secure partition, intra-partition message queues for two-way communication with the tenant application within the secure partition, and an application manager in the secure partition for routing messages between the extra-partition message queues and the intra-partition message queues. As used herein, the term "message queue" refers to any construct used for passing information between applications, such as queues, pipes, sockets, mailboxes, etc.

The ECB composer records the location at which the tenant application is being executed in the multi-tenant processing flow. After instantiation of the various constructs needed to execute the tenant application in the secure partition, on each execution of the multi-tenant application that includes the tenant application, at the location specified for execution of the tenant application, the multi-tenant application passes parameters to the secure partition via the extra-partition message queues. The application manager retrieves the parameters and identifies the tenant application specified by the parameters. For example, a secure partition may include multiple tenant applications, and a parameter passed from the multi-tenant application identifies which of the tenant applications is to be executed. The application manager posts parameters needed for execution of the tenant application to an intra-partition message queue associated with the application, which triggers execution of the tenant application. The tenant application retrieves the parameters and executes. Execution may be provided on the network-based computing system hosting the multi-tenant processing environment, or on any computer system in communication with the network-based computing system. For example, the tenant application may be executed by a computer system controlled by the entity. That tenant application posts results to the associated intra-partition message queue associated. The application manager retrieves the results from the intra-partition message queue and writes the results to the extra-partition message queue. The multi-tenant application retrieves the results from the extra-partition message queue and may apply the results in the multi-tenant processing flow.

Thus, the computing systems and methods disclosed herein allow an entity to add proprietary tenant applications to a multi-tenant processing flow. The tenant applications are executed via a secure partition used to maintain privacy of entity data. Tenant applications may be provided as source code (e.g., in an interpreted language such as Python), or as a binary (e.g., compiled code). The tenant applications are not viewable by the entity providing the multi-tenant processing flow or by entities executing the multi-tenant processing flow, other than the entity that added the tenant application to the multi-tenant processing flow. No information regarding the processing functionality provided by the tenant application is provided to the multi-tenant application that triggers execution of the tenant application.

FIG. 1 shows a block diagram for an example computer system 100 that provides multi-tenant processing with execution of a tenant proprietary application in a secure partition in accordance with the present disclosure. The computer system 100 includes a web services platform 102 that communicates with a user 104 via the Internet 106 (or other wired and/or wireless communication network). The user 104 represents an entity that access the web services platform 102 and includes computer hardware and software configured to communicate with the web services platform 102 via the Internet 106. Although a single user 104 is shown in FIG. 1, the computer system 100 may include any number of users 104 in communication with the web services platform 102 via the Internet 106.

The web services platform 102 includes a multi-tenant processing environment 108 and a secure partition 110. The secure partition 110 is assigned to the entity corresponding to the user 104 (i.e., a tenant), and stores the private data 134 of the entity. The web services platform 102 may include any number of secure partitions, each assigned to a different entity (i.e., a different tenant). For example, secure partition 112 including private data 136 is shown in FIG. 1, where the secure partition 110 assigned to, and accessible only by, a first tenant, and the secure partition 112 is assigned to, and accessible only by, a second tenant to maintain privacy of each tenant's data.

The multi-tenant processing environment 108 includes a multi-tenant application 114 and an ECB composer 116. As the multi-tenant application 114 and the ECB composer 116 reside in the multi-tenant processing environment 108, the software (i.e., the instructions) that make-up the multi-tenant application 114 and the ECB composer 116 are shared by all tenants. The user 104 communicates with the ECB composer 116 to enable addition of a tenant proprietary application 132 to a processing flow of the multi-tenant application 114. For example, the user 104 communicates with the multi-tenant processing environment 108 to trigger execution of the ECB composer 116. Thereafter, the ECB composer 116 communicates with the user 104 to acquire information regarding the tenant proprietary application 132. For example, the ECB composer 116 may present a graphical user interface to the user 104 through which parameters of the tenant proprietary application 132 are provided to the ECB composer 116. Such parameters may include information to be passed to the tenant proprietary application 132, information returned by the tenant proprietary application 132, the insertion location of the tenant proprietary application 132 in the processing flow of the multi-tenant application 114, and information regarding the compute environment (e.g., APACHE AIRFLOW, ARGO workflow, KUBEFLOW, etc.) of the tenant proprietary application 132.

Prior to making any modifications related to the tenant proprietary application 132, the ECB composer 116 verifies the authority of the user 104 to modify the processing flow of the multi-tenant application 114, to access or modify the content of the secure partition 110, etc. For example, the ECB composer 116 may require that the user 104 enter credential information and compare the credential information to stored information identifying individuals authorized to add a tenant proprietary application 132 to the processing flow of the multi-tenant application 114.

Given the verified authorization of the user 104, and the provision of parameters of the tenant proprietary application 132 by the user 104, the ECB composer 116 instantiates the various resources needed to enable the tenant proprietary application 132. The structures include extra-partition messages queues 119, intra-partition message queues 129, and an application manager 122. The extra-partition messages queues 119 include a partition request message queue 118 and partition response message queue 120. The partition request message queue 118 transfers computation parameters (e.g., parameters identifying the tenant proprietary application 132 and parameters to be applied by the tenant proprietary application 132) from the multi-tenant application 114 to the secure partition 110. That is, as the multi-tenant application 114 executes a processing flow to a point at which the tenant proprietary application 132 is to be activated, the multi-tenant application 114 writes the computation parameters to the partition request message queue 118 to activate the tenant proprietary application 132.

The partition response message queue 120 transfers result values generated by execution of the tenant proprietary application 132 from the secure partition 110 to the multi-tenant application 114. That is, after execution of the tenant proprietary application 132 has produces result values, the application manager 122 writes the result values to the partition response message queue 120 for receipt by the multi-tenant application 114.

The application manager 122 coordinates the transfer of information between the multi-tenant application 114 and the tenant proprietary application 132. The application manager 122 may interact with any number of tenant proprietary applications disposed in or associated with the secure partition 110. The multi-tenant application 114 includes a tenant application sender 124 and a tenant application receiver 126. The tenant application sender 124 retrieves information from the partition request message queue 118, analyzes the retrieved information to identify the tenant proprietary application to be activated, and passes information to be processed to the tenant proprietary application 132. The tenant application sender 124 may identify the tenant proprietary application to be activated based on one or more parameters received from the multi-tenant application 114 (via the partition request message queue 118).

The tenant application receiver 126 receives results of processing from the tenant proprietary application and passes the results to the multi-tenant application 114. That is, the tenant application receiver 126 writes the results to the partition response message queue 120, and the multi-tenant application 114 retrieves the results from the partition response message queue 120 for use in subsequent steps of the executing processing flow.

The intra-partition message queues 129 includes a tenant application request message queue 128 and a tenant application response message queue 130. That tenant application sender 124 passes information to be processed to the tenant proprietary application 132 via the tenant application request message queue 128. That is, the tenant application sender 124 writes information to be processed by execution of the tenant proprietary application 132 to the tenant application request message queue 128. The tenant proprietary application 132 retrieves the information from the tenant application request message queue 128. For example, the tenant proprietary application 132 may monitor the tenant application request message queue 128 for the presence of information to be processed, and initiate processing based on the presence of information in the tenant application request message queue 128.

The tenant proprietary application 132 passes results of processing to the tenant application receiver 126 via the tenant application response message queue 130. That is, the tenant proprietary application 132 writes results generated by execution (e.g., results of processing information retrieved from the tenant application request message queue 128) to the tenant application response message queue 130. The tenant application receiver 126 retrieves the results from the tenant application response message queue 130 and passes the results to the multi-tenant application 114 via the partition response message queue 120.

The tenant proprietary application 132 may be any set of instructions executable by a processor to perform a function desired by the entity to which the secure partition 110 is assigned. For example, the tenant proprietary application 132 may include a trained machine learning model, a batch processing flow, or any other executable software. Because the tenant proprietary application 132 is executed via the secure partition 110, the tenant proprietary application 132 is not exposed to the multi-tenant processing environment 108 and is isolated from all entities accessing the multi-tenant processing environment 108 (other than the entity associated with the secure partition 110).

The web services platform 102 includes a plurality of computers arranged to execute applications that provide services to the users 104. For example, the web services platform 102 may include computer hardware and software systems provided by GOOGLE CLOUD, AMAZON WEB SERVICES, MICROSOFT AZURE, or other cloud computing services. In one example, the multi-tenant processing environment 108 is a hydrocarbon exploration and production information processing environment, such as the DELFI environment provided by SCHLUMBERGER LIMITED.

Figure 2:
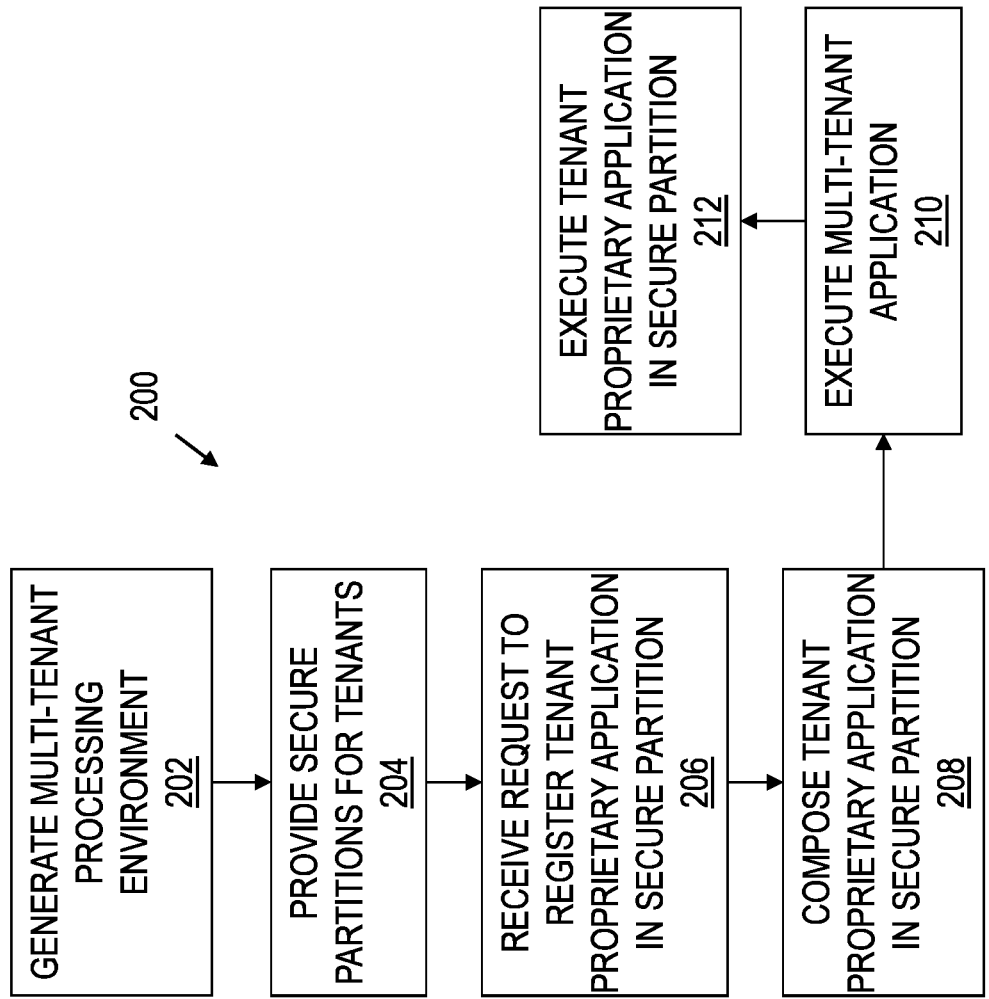
FIG. 2 shows a flow diagram for an example method for providing a tenant proprietary application in a secure partition of a multi-tenant processing environment in accordance with the present disclosure.

FIG. 2 shows a flow diagram for an example method 200 for executing a tenant proprietary application in a secure partition of a multi-tenant processing environment in accordance with the present disclosure. Though depicted sequentially as a matter of convenience, at least some of the actions shown can be performed in a different order and/or performed in parallel. Additionally, some embodiments may perform only some of the actions shown. In some embodiments, at least some of the operations of the method 200 may be provided by instructions executed by an instance of a computing system implementing the multi-tenant processing environment 108 and the secure partition 110.

In block 202, a multi-tenant processing environment is generated. For example, the multi-tenant processing environment 108 is instantiated in the web services platform 102. The multi-tenant processing environment 108 includes at least the multi-tenant application 114 and the ECB composer 116, which include software that may be accessed by multiple tenants.

In block 204, the multi-tenant processing environment 108 provides a secure partition for each tenant accessing the multi-tenant processing environment 108. The secure partition is for storage of a single tenant's private data and for execution of tenant proprietary applications. In FIG. 1, the secure partition 110 and secure partition 112 are shown, while in practice, a secure partition may be provided for each tenant accessing the multi-tenant processing environment 108.

In block 206, the ECB composer 116 receives a request (from the user 104) to register a tenant proprietary application 132 with the multi-tenant processing environment 108. That is, the ECB composer 116 receives a request to modify an existing processing flow, or create a new processing flow, that includes execution of a tenant proprietary application 132 via the secure partition of the entity with which the user 104 is associated. Additional information regarding registration of the tenant proprietary application 132 is provided in FIG. 3 and associated description.

In block 208, the ECB composer 116 prepares the tenant proprietary application 132 and supporting resources in the secure partition of the entity with which the user 104 is associated.

In block 210, a multi-tenant processing flow of the multi-tenant application 114 is executed on behalf of the entity that requested the tenant proprietary application 132 in block 206.

In block 212, execution of the multi-tenant processing flow proceeds to a point at which the tenant proprietary application 132 is to be executed, the multi-tenant application 114 communicates with the secure partition 110, and the tenant proprietary application 132 is executed. Additional information regarding execution of the tenant proprietary application 132 is provided in FIG. 4 and associated description.

Figure 3:
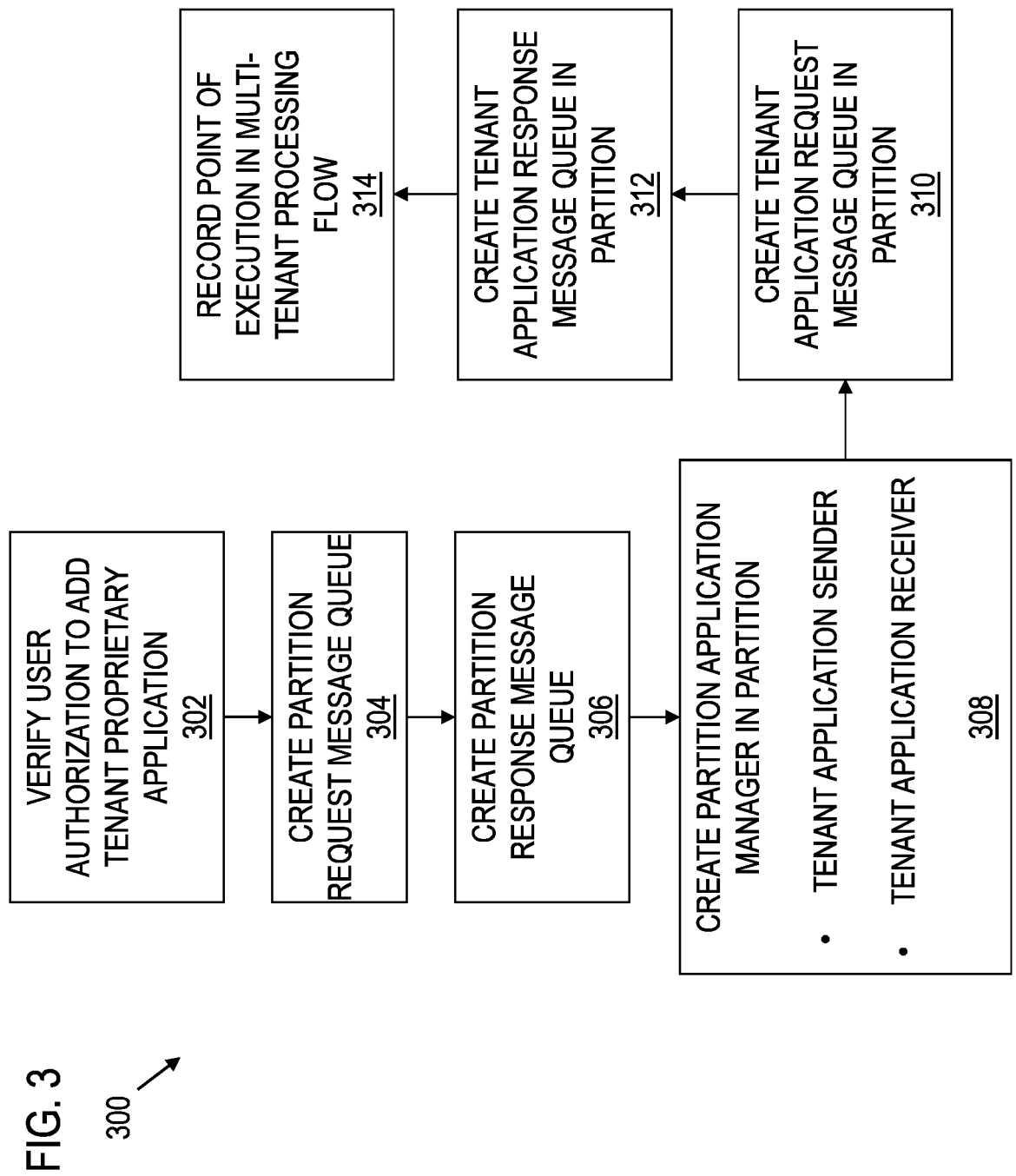
FIG. 3 shows a flow diagram for an example method for composing a tenant proprietary application for execution in a secure partition of a multi-tenant processing environment in accordance with the present disclosure.

FIG. 3 shows a flow diagram for an example method 300 for composing a tenant proprietary application for execution in a secure partition of a multi-tenant processing environment in accordance with the present disclosure. Though depicted sequentially as a matter of convenience, at least some of the actions shown can be performed in a different order and/or performed in parallel. Additionally, some embodiments may perform only some of the actions shown. In some embodiments, at least some of the operations of the method 300 may be provided by instructions executed by an instance of a computing system implementing the ECB composer 116, and the secure partition 110. In the method 300, the ECB composer 116 has received a request to register a tenant proprietary application 132, as in block 206 of the method 200. The operations of the method 300 may be performed as operations of the block 208 of the method 200.

In block 302, the ECB composer 116 verifies authorization of the user 104 to add the tenant proprietary application 132 to the secure partition 110. For example, the ECB composer 116 may require that the user 104 enter credential information and compare the credential information to stored information identifying individuals authorized to add a tenant proprietary application 132 to the processing flow of the multi-tenant application 114.

In blocks 304 and 306, the ECB composer 116 creates the extra-partition messages queues 119 to enable communication between the secure partition 110 and the multi-tenant application 114. In block 304, the ECB composer 116 creates the partition request message queue 118 to enable transfer of information from the multi-tenant application 114 to the secure partition 110. The partition request message queue 118 includes an input port into which the multi-tenant application 114 writes information and an output port from which the tenant application sender 124 retrieves information written to the partition request message queue 118 by the multi-tenant application 114.

In block 306, the ECB composer 116 creates the partition response message queue 120 to enable transfer of information from the secure partition 110 to the multi-tenant application 114. The partition response message queue 120 includes an input port into which the tenant application receiver 126 writes information and an output port from which the multi-tenant application 114 retrieves information written to the partition response message queue 120 by the tenant application receiver 126.

In block 308, the ECB composer 116 creates the application manager 122. The application manager 122 coordinates transfer of information between one or more tenant proprietary applications of the secure partition 110 and the extra-partition messages queues 119. Creation of the application manager 122 includes creation of the tenant application sender 124 and creation of the tenant application receiver 126. The tenant application sender 124 retrieves information from the partition request message queue 118, identifies the tenant proprietary application 132 to be activated based on the retrieved information, and passes the retrieved information to the tenant proprietary application 132 via the tenant application request message queue 128. The tenant application receiver 126 retrieves results generated by the tenant proprietary application 132 from the tenant application response message queue 130 and passes the results to the multi-tenant application 114 via the partition response message queue 120.

In block 310 and 312, the ECB composer 116 creates the intra-partition message queues 129 to enable communication between the application manager 122 and the tenant proprietary application 132 within the secure partition 110. In block 310, the ECB composer 116 creates the tenant application request message queue 128 to enable transfer of information from the tenant application sender 124 to the tenant proprietary application 132. The tenant application request message queue 128 includes an input port into which the tenant application sender 124 writes information and an output port from which the tenant proprietary application 132 retrieves information written to the tenant application request message queue 128 by the tenant application sender 124.

In block 312, the ECB composer 116 creates the tenant application response message queue 130 to enable transfer of information from the tenant proprietary application 132 to the application manager 122. The tenant application response message queue 130 includes an input port into which the tenant proprietary application 132 writes results of processing and an output port from which the tenant application receiver 126 retrieves information written to the tenant application response message queue 130 by the tenant proprietary application 132.

In block 314, the ECB composer 116 records the point within a processing flow of the multi-tenant application 114 at which the tenant proprietary application 132 is to be executed. For example, if a particular processing flow of the multi-tenant application 114 includes stages 1-10, then the user 104 may specify that the tenant proprietary application 132 is to be executed between stages 5 and 6 of the processing flows, before or after any of the stages 1-10, etc. Similarly, the user 104 may specify that the tenant proprietary application 132 is to be executed in place of (i.e., is to replace) any of stages 1-10 of the processing flow.

Figure 4:
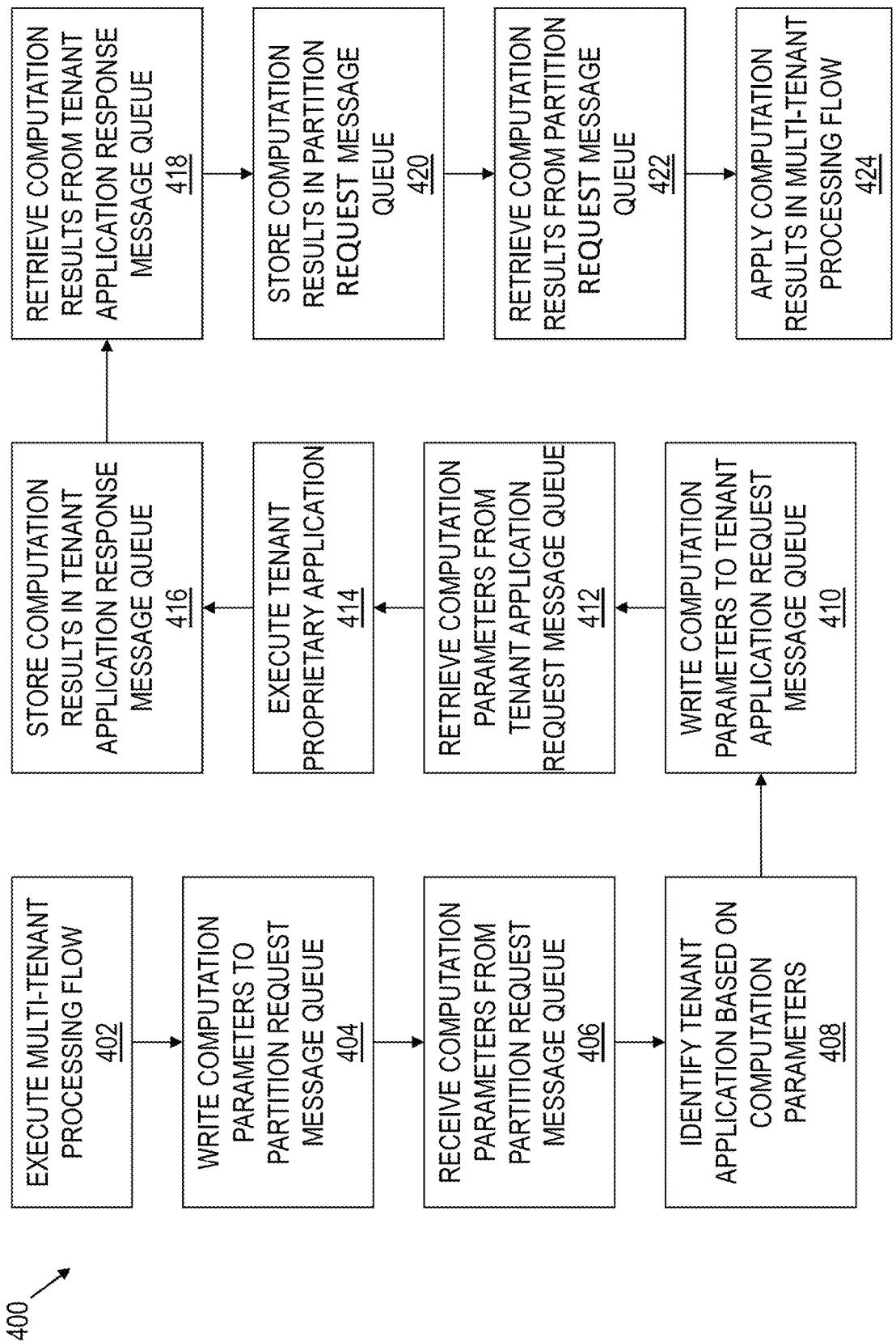
FIG. 4 shows a flow diagram for an example method for executing a tenant proprietary application in a secure partition of a multi-tenant processing environment in accordance with the present disclosure.

FIG. 4 shows a flow diagram for an example method 400 for executing a tenant proprietary application in a secure partition of a multi-tenant processing environment in accordance with the present disclosure. Though depicted sequentially as a matter of convenience, at least some of the actions shown can be performed in a different order and/or performed in parallel. Additionally, some embodiments may perform only some of the actions shown. In some embodiments, at least some of the operations of the method 400 may be provided by instructions executed by an instance of a computing system implementing the multi-tenant application 114, the ECB composer 116, and the secure partition 110. Some operations of the method 400 may be performed as operations of the block 212 of the method 200.

In block 402, a multi-tenant processing flow of the multi-tenant application 114 is being executed by the multi-tenant processing environment 108 on behalf of the entity associated with the user 104. As the processing flow executes, the multi-tenant application 114 recognizes that execution has proceeded to the point at which the tenant proprietary application 132 is to be activated. For example, information associated with or identifying the various stages of the processing flow may indicate that the tenant proprietary application 132 is to be activated immediately before or after execution of a particular stage of the processing flow.

In block 404, the tenant proprietary application 132 is to be activated, and the multi-tenant application 114 writes information identifying the tenant proprietary application 132, and information to be processed by the tenant proprietary application 132 to the partition request message queue 118.

In block 406, operation of the tenant application sender 124 is triggered by the presence of information in the partition request message queue 118. The tenant application sender 124 retrieves the information from the partition request message queue 118.

In block 408, the tenant application sender 124 analyzes the information retrieved from the partition request message queue 118 to identify a tenant proprietary application to be executed. For example, one or more parameters retrieved from the partition request message queue 118 may include a value that identifies the tenant proprietary application 132. The value itself provides no indication of the functionality provided by the tenant proprietary application 132, and the functionality provided by the tenant proprietary application 132 is unknown to the multi-tenant application 114. The tenant application sender 124 may compare the value retrieved from the partition request message queue 118 to stored information that relates values retrieved from the partition request message queue 118 to the various tenant proprietary applications provided within the secure partition 110 to identify the tenant proprietary application 132 to be executed.

In block 410, the tenant application sender 124 has identified the tenant proprietary application 132, and writes information retrieved from the partition request message queue 118, and/or other computational parameters, to the tenant application request message queue 128 associated with the tenant proprietary application 132. For example, a different set of intra-partition message queues 129 may be associated with each tenant proprietary application provided by the secure partition 110.

In block 412, the execution of the tenant proprietary application 132 is triggered by the presence of information in the tenant application request message queue 128. The tenant proprietary application 132 retrieves the information from the tenant application request message queue 128.

In block 414, the tenant proprietary application 132 processes the information retrieved from the tenant application request message queue 128. For example, the tenant proprietary application 132 may apply a trained machine learning model or other executable software to the information retrieved from the tenant application request message queue 128, or to information pointed to or otherwise identified by the information retrieved from the tenant application request message queue 128. The tenant proprietary application 132 may provide any functionality using any computer hardware local to or remote from the web services platform 102, and any arrangement of instructions executable by the computer hardware.

In block 416, the tenant proprietary application 132 stores the results of processing in the tenant application response message queue 130.

In block 418, the tenant application receiver 126 detects the results stored in the tenant application response message queue 130 and retrieves the results from the tenant application response message queue 130.

In block 420, the tenant application receiver 126 passes the results of processing to the multi-tenant application 114. That is, the tenant application receiver 126 stores the results retrieved from the tenant application response message queue 130 in the tenant application request message queue 128.

In block 422, the multi-tenant application 114 detects the results in the tenant application request message queue 128 and retrieves the results.

In block 424, the multi-tenant application 114 applies the results retrieved from the tenant application request message queue 128 in the multi-tenant processing flow.

Figure 5:
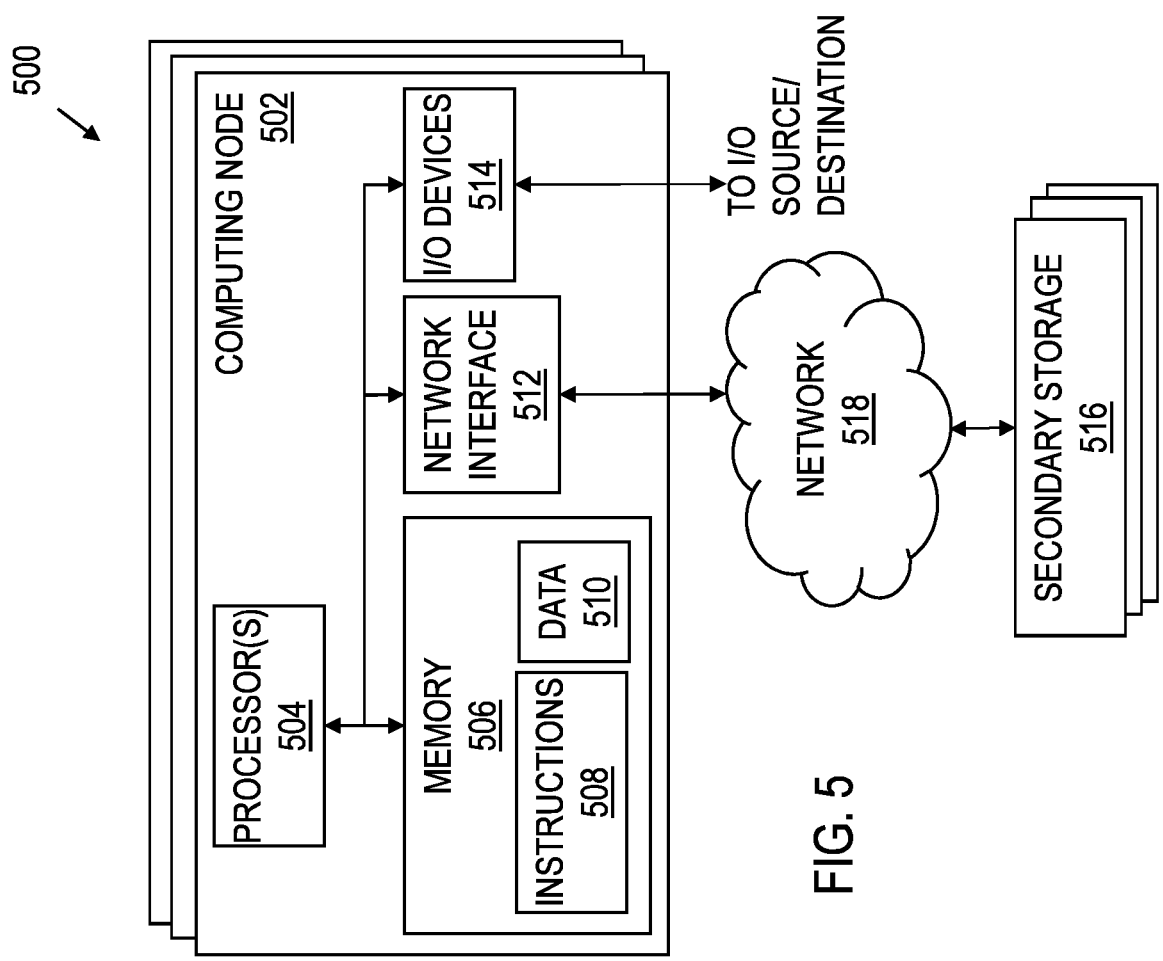
FIG. 5 shows a schematic diagram for a computing system suitable for implementing a multi-tenant processing environment that includes execution of a tenant defined computation in a secure partition in accordance with the present disclosure.

FIG. 5 shows a block diagram for a computing system 500 suitable for use in the systems disclosed herein. Examples of the computing system 500 may be applied to implement the multi-tenant processing environment 108, the secure partition 110, and sub-components thereof. The computing system 500 includes one or more computing nodes 502 and secondary storage 516 that are communicatively coupled (e.g., via the network interface 518). One or more of the computing nodes 502 and associated secondary storage 516 may be applied to provide the functionality of the multi-tenant processing environment 108, the secure partition 110, and sub-components thereof as described herein.

Each computing node 502 includes one or more processors 504 coupled to memory 506, a network interface 512, and a user I/O interface 514. In various embodiments, a computing node 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors, graphics processing units (GPUs), digital signal processors (DSPs) implementing any of a variety of instruction set architectures (ISAs). In multiprocessor systems, each of the processors 504 may commonly, but not necessarily, implement the same ISA.

The memory 506 may include a non-transitory, computer-readable storage medium configured to store program instructions 508 and/or data 510 accessible by processor(s) 504. The memory 506 may be implemented using any suitable memory technology, such as static random-access memory (SRAM), synchronous dynamic RAM (SDRAM), nonvolatile/Flash-type memory, or any other type of memory. Program instructions 508 and data 510 implementing the functionality disclosed herein are stored within memory 506. For example, instructions 508 may include instructions that when executed by processor(s) 504 implement the multi-tenant processing environment 108, the secure partition 110, and sub-components thereof as disclosed herein.

Secondary storage 516 may include volatile or non-volatile storage and storage devices for storing information such as program instructions and/or data as described herein for implementing the multi-tenant processing environment 108, the secure partition 110, and sub-components thereof. The secondary storage 516 may include various types of computer-readable media accessible by the computing node 502 via the network interface 518. A computer-readable medium may include storage media or memory media such as semiconductor storage; magnetic or optical media, e.g., disk or CD/DVD-ROM; or other storage technologies.

The network interface 518 includes circuitry configured to allow data to be exchanged between computing node 502 and/or other devices coupled to a network (such as the Internet 106). For example, the network interface 512 may be configured to allow data to be exchanged between a first instance of the computing system 500 configured to operate as the multi-tenant processing environment 108 and a second instance of the computing system 500 configured to operate as the secure partition 110. The network interface 512 may support communication via wired or wireless data networks.

The user I/O interface 514 allows the computing node 502 to communicate with various input/output devices such as one or more display terminals, keyboards, keypads, touchpads, scanning devices, voice or optical recognition devices, or any other devices suitable for entering or retrieving data by one or more computing nodes 502. Multiple input/output devices may be present n a computing system 500.

Those skilled in the art will appreciate that the computing system 500 is merely illustrative and is not intended to limit the scope of embodiments. In particular, the computing system 500 may include any combination of hardware or software that can perform the functions disclosed herein. Computing node 502 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computing system, comprising:
one or more processors;
a memory coupled to the one or more processors and encoded with instructions that when executed cause the one or more processors to:
  generate a multi-tenant processing environment configured to implement a multi-tenant processing flow comprising a plurality of stages, wherein the multi-tenant processing environment comprises a hydrocarbon exploration and production processing environment and the multi-tenant processing flow comprises a hydrocarbon production flow;
  provide, for each tenant of a plurality of tenants of the multi-tenant processing environment, a secure partition configured to store and isolate data and computational resources of the tenant of the plurality of tenants;
  receive, from the tenant, a request to register, with the multi-tenant processing environment, a tenant application to be executed at a stage of the plurality of stages of the multi-tenant processing flow by the secure partition of the tenant, wherein the tenant application is tenant proprietary application not viewable by any other tenant of the plurality of tenants; and
  responsive to the request:
    create a partition request message queue configured to pass computation parameters from a multi-tenant application to the secure partition of the tenant, wherein the computation parameters pertain to the hydrocarbon production flow;
    create a partition response message queue configured to pass a computation result from the secure partition of the tenant to the multi-tenant application to be used in the hydrocarbon production flow; and
    create, within the secure partition, an application manager configured to:
      receive the computation parameters from the partition request message queue;

pass one or more of the computation parameters to the tenant application;
receive the computation result from the tenant application; and
store the computation result in the partition response message queue.

2. The computing system of claim 1, wherein the memory is encoded with instructions that when executed cause the one or more processors to, responsive to the request: create a tenant application request message queue configured to pass the one or more of the computation parameters from the application manager to the tenant application.

3. The computing system of claim 1, wherein the memory is encoded with instructions that when executed cause the one or more processors to, responsive to the request: create a tenant application response message queue configured to pass the computation result from the tenant application to the application manager.

4. The computing system of claim 1, wherein the memory is encoded with instructions that when executed cause the one or more processors to, responsive to the request, verify authority of the tenant to access the secure partition.

5. The computing system of claim 1, wherein the memory is encoded with instructions that when executed cause the one or more processors to verify authority of the tenant to modify the multi-tenant processing flow by:
prompting entry of credential information;
compare the credential information to stored credential information of the tenant; and
verifying the authority based on a match between the credential information and the stored credential information.

6. The computing system of claim 1, wherein the memory is encoded with instructions that when executed cause the one or more processors to:
execute each stage of the plurality of stages of the multi-tenant processing flow;
write the computation parameters to the partition request message queue at the stage of execution of the tenant application; and
retrieve the computation result from the partition response message queue.

7. The computing system of claim 1, wherein the computation parameters configured to execute the tenant application are controlled by the tenant, and wherein the computation parameters comprise a first set of parameters identifying the tenant application and a second set of parameters to be applied by the tenant application.

8. The computing system of claim 1, wherein the application manager comprises a tenant application sender configured to identify the tenant application based on one or more of the computation parameters received from the partition request message queue.

9. The computing system of claim 8, wherein the tenant application sender is configured to select the tenant application from a plurality of tenant applications in the secure partition based on the one or more of the computation parameters received from the partition request message queue.

10. A non-transitory computer-readable medium encoded with instructions that when executed by one or more processors cause the one or more processors to:
generate a multi-tenant processing environment configured to implement a multi-tenant processing flow comprising a plurality of stages, wherein the multi-tenant processing environment comprises a hydrocarbon exploration and production processing environment and the multi-tenant processing flow comprises a hydrocarbon production flow;
provide, for each tenant of a plurality of tenants of the multi-tenant processing environment, a secure partition configured to store and isolate data and computational resources of the tenant of the plurality of tenants;
receive, from the tenant, a request to register, with the multi-tenant processing environment, a tenant application to be executed at a stage of the plurality of stages of the multi-tenant processing flow by the secure partition of the tenant, wherein the tenant application not viewable by any other tenant of the plurality of tenants; and
responsive to the request:
create a partition request message queue configured to pass computation parameters from a multi-tenant application to the secure partition of the tenant, wherein the computation parameters pertain to the hydrocarbon production flow;
create a partition response message queue configured to pass a computation result from the secure partition of the tenant to the multi-tenant application to be used in the hydrocarbon production flow; and
create, within the secure partition, an application manager configured to:
receive the computation parameters from the partition request message queue;
pass one or more of the computation parameters to the tenant application;
receive the computation result from the tenant application; and
store the computation result in the partition response message queue.

11. The non-transitory computer-readable medium of claim 10, wherein the instructions cause the one or more processors to, responsive to the request, verify authority of the tenant to access the secure partition.

12. The non-transitory computer-readable medium of claim 10, wherein the instructions cause the one or more processors to create, as part of the application manager, a tenant application sender configured to identify the tenant application based on one or more of the computation parameters received from the partition request message queue.

13. The non-transitory computer-readable medium of claim 10, wherein the instructions cause the one or more processors to select the tenant application from a plurality of tenant applications in the secure partition based on one or more of the computation parameters received from the partition request message queue.

14. The non-transitory computer-readable medium of claim 10, wherein the instructions cause the one or more processors to, responsive to the request: create a tenant application request message queue configured to pass the one or more of the computation parameters from the application manager to the tenant application.

15. The non-transitory computer-readable medium of claim 14, wherein the instructions cause the one or more processors to, responsive to the request: create a tenant application response message queue configured to pass the computation result from the tenant application to the application manager.

16. The non-transitory computer-readable medium of claim 15, wherein the instructions cause the one or more processors to, responsive to the request, record the stage of execution of the tenant application in the plurality of stages of the multi-tenant processing flow.

17. The non-transitory computer-readable medium of claim 16, wherein the instructions cause the one or more processors to:
- execute each stage of the plurality of stages of the multi-tenant processing flow;
- write the computation parameters to the partition request message queue at the stage of execution of the tenant application; and
- retrieve the computation result from the partition response message queue.

18. The non-transitory computer-readable medium of claim 17, wherein the instructions cause the one or more processors to:
- retrieve the computation parameters from the partition request message queue;
- identify the tenant application to be executed based on the one or more of the computation parameters retrieved from the partition request message queue;
- write at least one of the computation parameters to the tenant application request message queue;
- retrieve the computation result from the tenant application response message queue; and
- store the computation result in the partition response message queue.

19. A method, comprising:
- generating, by a computer system, a multi-tenant processing environment configured to implement a multi-tenant processing flow comprising a plurality of stages, wherein the multi-tenant processing environment comprises a hydrocarbon exploration and production processing environment and the multi-tenant processing flow comprises a hydrocarbon production flow;
- providing, by the computer system, for each tenant of a plurality of tenants of the multi-tenant processing environment, a secure partition configured to store and isolate data and computational resources of the tenant of the plurality of tenants;
- receiving, by the computer system, from the tenant, a request to register, with the multi-tenant processing environment, a tenant application to be executed at a stage of the plurality of stages of the multi-tenant processing flow by the secure partition of the tenant, wherein the tenant application is a tenant proprietary application not viewable by any other tenant of the plurality of tenants; and
- responsive to the request:
  - creating, by the computer system, a partition request message queue configured to pass computation parameters from a multi-tenant application to the secure partition of the tenant, wherein the computation parameters pertain to the hydrocarbon production flow;
  - creating, by the computer system, a partition response message queue configured to pass a computation result from the secure partition of the tenant to the multi-tenant application to be used in the hydrocarbon production flow;
  - creating, by the computer system, within the secure partition, an application manager configured to:
    - receive the computation parameters from the partition request message queue;
    - pass one or more of the computation parameters to the tenant application;
    - receive the computation result from the tenant application; and
    - store the computation result in the partition response message queue.

20. The method of claim 19, further comprising, responsive to the request, verifying, by the computer system, authority of the tenant to access the secure partition.

21. The method of claim 19, further comprising identifying, by the computer system, the tenant application based on one or more of the computation parameters received from the partition request message queue.

22. The method of claim 19, further comprising:
- creating, by the computer system, as part of the application manager, a tenant application sender configured to identify the tenant application based on one or more of the computation parameters received from the partition request message queue;
- creating, by the computer system, within the secure partition, a tenant application request message queue configured to pass the one or more of the computation parameters from the application manager to the tenant application; and
- creating, by the computer system, within the secure partition, a tenant application response message queue configured to pass the computation result from the tenant application to the application manager.

23. The method of claim 22, further comprising:
- recording, by the multi-tenant application, responsive to the request, the stage of execution of the tenant application in the plurality of stages of the multi-tenant processing flow;
- executing, by the multi-tenant application, the plurality of stages of the multi-tenant processing flow;
- prior to executing the stage in the multi-tenant processing flow, activating, by the multi-tenant application, the tenant application;
- writing, by the multi-tenant application, the computation parameters to the partition request message queue at the stage of execution of the tenant application; and
- retrieving, by the multi-tenant application, the computation result from the partition response message queue.

24. The method of claim 23, further comprising:
- retrieving, by the application manager, the computation parameters from the partition request message queue;
- identifying, by the application manager, the tenant application to be executed based on the one or more of the computation parameters retrieved from the partition request message queue;
- writing, by the application manager, at least one of the computation parameters to the tenant application request message queue corresponding to the identified tenant application;
- retrieving, by the application manager, the computation result from the tenant application response message queue corresponding to the tenant application; and
- storing, by the application manager, the computation result in the partition response message queue.

* * * * *